(12) United States Patent
Ando et al.

(10) Patent No.: US 8,264,785 B2
(45) Date of Patent: Sep. 11, 2012

(54) IMAGING LENS

(75) Inventors: Minoru Ando, Saitama (JP); Takahiro Mitsuhashi, Saitama (JP)

(73) Assignee: Tamron Co., Ltd., Saitama-shi (JP)

( * ) Notice: Subject to any disclaimer, the term of this patent is extended or adjusted under 35 U.S.C. 154(b) by 82 days.

(21) Appl. No.: 12/936,730

(22) PCT Filed: Dec. 12, 2008

(86) PCT No.: PCT/JP2008/072668
§ 371 (c)(1),
(2), (4) Date: Oct. 7, 2010

(87) PCT Pub. No.: WO2009/125522
PCT Pub. Date: Oct. 15, 2009

(65) Prior Publication Data
US 2011/0051261 A1    Mar. 3, 2011

(30) Foreign Application Priority Data

Apr. 10, 2008  (JP) ................................. 2008-102707
Apr. 18, 2008  (JP) ................................. 2008-109278

(51) Int. Cl.
*G02B 9/34* (2006.01)
*G02B 13/18* (2006.01)

(52) U.S. Cl. ...................................... 359/781; 359/715
(58) Field of Classification Search .................. 359/715, 359/781
See application file for complete search history.

(56) References Cited

U.S. PATENT DOCUMENTS

| | | | |
|---|---|---|---|
| 4,781,449 A * | 11/1988 | Hirakawa et al. | ............. 359/753 |
| 5,499,142 A | 3/1996 | Ohshita | |
| 5,966,251 A | 10/1999 | Nagahara | |
| 2004/0155176 A1 | 8/2004 | Ito | |
| 2006/0145061 A1 | 7/2006 | Ito | |

FOREIGN PATENT DOCUMENTS

| JP | 2-43512 A | 2/1990 |
|---|---|---|
| JP | 6-94992 A | 4/1994 |
| JP | 6-308384 A | 11/1994 |
| JP | 10-288736 A | 10/1998 |
| JP | 10-325919 A | 12/1998 |
| JP | 2004-240123 A | 8/2004 |
| JP | 2004-354572 A | 12/2004 |
| JP | 2006-23323 A | 1/2006 |

* cited by examiner

*Primary Examiner* — William Choi
(74) *Attorney, Agent, or Firm* — Foley & Lardner LLP

(57) ABSTRACT

An imaging lens includes, sequentially from an object side, a first lens ($L_{11}$) configured by a negative meniscus lens disposed with the convex surface on the object side; a second lens ($L_{12}$) configured by a positive biconvex lens; a negative third lens ($L_{13}$); and a fourth lens group ($L_{14}$) configured by a positive meniscus lens disposed with the convex surface on the image plane IMG side. By satisfying given conditions, the imaging lens is able to control ghosting occurring between the last lens surface and the imaging element and ghosting caused by light reflected by the lens surface nearest the object, without sacrifice to the compact-size of the optical system or high optical performance.

6 Claims, 13 Drawing Sheets

IMAGING LENS

TECHNICAL FIELD

The present invention relates to a compact, light-weight imaging lens suitable for imaging apparatuses having a solid state imaging device such as a charged coupled device (CCD) and complementary metal oxide semiconductor (CMOS).

BACKGROUND ART

In recent years, imaging apparatuses that can be mounted in vehicles (vehicle-mounted cameras) have become prevalent. Highly reliable lenses that are compact, have a simple configuration, and produce bright images are demanded for vehicle-mounted cameras. For example, since the interior of the vehicle may be subject to extremely high temperatures, a configuration that does not employ cemented lenses, which are easily affected by temperature changes, is preferred. Further, some approaches adopt a high dynamic camera as a vehicle-mounted camera and use a scheme to recognize a person or an object in a captured image. In order to accurately recognize a person or an object, a scheme to control stray light and ghosting occurring at imaging elements and lens surfaces, even if light from the headlights of an oncoming vehicle directly enters the camera when this recognition is performed is further demanded.

Since one objective is to capture images while the vehicle is in motion, pan-focus lenses, which reduce the driving portion and do not focus according to the distance of the object, are often adopted as the imaging lens in vehicle-mounted cameras. Additionally, with vehicle-mounted cameras, since light from the headlights of an oncoming vehicle may directly enter the camera at night, a scheme to control stray light and ghosting occurring at imaging elements and lens surfaces is demanded.

Various imaging lenses have been proposed that can be mounted to a vehicle-mounted camera, that are compact, have a simple configuration, and produce bright images (see, for example, Patent Documents 1 and 2).
[Patent Document 1] Japanese Patent Application Laid-Open Publication No. 2004-240123
[Patent Document 2] Japanese Patent Application Laid-Open Publication No. H6-308384

DISCLOSURE OF INVENTION

Problem to be Solved by the Invention

The imaging lens recited in Patent Document 1 has a simple configuration, but correction of spherical aberration is insufficient. A further disadvantage is that, the position of the exit pupil is near the image plane and thus, the angle of incidence of light rays to the image plane is large and if a solid-state imaging device such as a CCD or CMOS is used, the amount of nearby light may drop.

The imaging lens recited in Patent Document 2 is a large diameter lens of F 2.0 and produces bright images, but also has a problem in that correction of spherical aberration is insufficient. A further disadvantage is that, the position of the exit pupil is near the image plane and thus, the angle of incidence of light rays to the image plane is large and if a solid-state imaging device such as a CCD or CMOS is used, the amount of nearby light may drop.

To solve the problems associated with the conventional technologies, an object of the present invention is to provide a compact, high performance imaging lens capable of excellent correction of various types of aberration occurring at the lenses and controlling ghosting occurring at imaging devices and lens surfaces.

Means for Solving Problem

To solve the problems above and achieve an object, an imaging lens according to oen embodiment of the invention includes, sequentially from an object side, a negative first lens, a positive second lens, a negative third lens, and a positive fourth lens having a convex surface on the image side. The imaging lens is further characterized by satisfying the conditional expressions below.

$$\theta \geq 30° \quad (1)$$

$$f/R_1 \geq 0.3 \quad (2)$$

Where, $\theta$ is the absolute value of an angle formed by a marginal ray of the central beam emitted from the last lens surface of the imaging lens and the normal to the lens at the position where the ray is emitted, f is the focal length of the imaging lens, and $R_1$ is the radius of curvature of a first lens surface in the imaging lens.

The invention according to this embodiment enables effective control of ghosting occurring between the last lens surface of the imaging lens and the imaging element, and between the lens surface nearest the object and the imaging element.

The imaging lens according to one embodiment of the invention is characterized by satisfying the conditional expression below, where the refractive index at the d-line of the first lens is $n_1$.

$$n_1 \geq 1.51 \quad (3)$$

The invention according to this embodiment enables ghosting that occurs between the lens surface nearest the object and the imaging element to be more effectively controlled, in an imaging lens satisfying the conditions cited above.

The imaging lens according to one embodiment of the invention is characterized in that an aspheric surface is formed on at least one surface of the second lens.

The invention according to this embodiment enables effective correction of spherical aberration.

The imaging lens according to one embodiment of the invention is characterized in that the second lens is configured by a biconvex lens.

The invention according to this embodiment enables the refractive power of the second lens in the imaging lens to be increased and enables more effective correction of spherical aberration.

The imaging lens according to one embodiment of the invention is based on any one of the embodiment cited above and characterized in that the first lens is configured by a meniscus lens disposed with the convex surface on the object side.

The invention according to this embodiment enables a reduction in ghosting caused by light reflected to the image side by the lens surface nearest the object.

The imaging lens according one embodiment includes sequentially from the object side, a positive first lens group, a negative second lens group, a positive third lens group, and a fourth lens group configured by a meniscus lens disposed with the concave surface on the object side. The imaging lens is further characterized by satisfying the conditional expressions below.

$$BF/L \geq 0.3 \quad (4)$$

$$\theta \geq 15.0° \quad (5)$$

Where, BF is the back focal length of the imaging lens, L is the distance from the first lens surface in the imaging lens to the image plane, θ is the absolute value of the angle formed by a marginal ray of the central beam emitted from the last lens surface of the imaging lens and the normal to the lens at the position where the ray is emitted.

The invention according to this embodiment enables effective control of ghosting occurring between the last lens surface of the imaging lens and the imaging device.

The imaging lens according to an embodiment of the invention is characterized by satisfying the conditional expression below, where the focal length of the imaging lens is f and in the imaging lens, the radius of curvature of the lens surface nearest the object and is $R_1$.

$$f/R_1 \geq 0.5 \quad (6)$$

The invention according to this embodiment enables effective control of ghosting caused by light that is reflected from the imaging device and re-reflected by the lens surface nearest the object.

The imaging lens according to one embodiment of the invention is characterized by satisfying the conditional expression below, where the interval between the third lens group and the fourth lens group is $D_{3-4}$.

$$D_{3-4}/f \leq 0.08 \quad (7)$$

The invention according to this embodiment enables a compact imaging lens to be achieved and excellent correction of field curvature.

The imaging lens according to one embodiment of the invention is characterized by satisfying the conditional expression below, where the refractive index at the d-line of the third lens group is $n_3$.

$$n_3 \geq 1.72 \quad (8)$$

The invention according to this embodiment enables image formation performance to be maintained by keeping the position of the image plane fixed.

The imaging lens according to one embodiment of the invention is characterized by satisfying the conditional expression below, where the focal length of the image-side lens surface of the third lens group is $f_3$.

$$2.0 \geq f/f_3 \geq 1.35 \quad (9)$$

The invention according to this embodiment enables excellent correction of spherical aberration occurring primarily at the second lens group of the imaging lens.

The imaging lens according to one embodiment of the invention is characterized in that the third lens group is configured by a biconvex lens.

The invention according to thisd embodiment enables the refractive power of the third lens group of the imaging lens to be increased and facilitates more effective correction of the spherical aberration occurring at the second lens group.

Effect of the Invention

The present invention enables a compact, high performance imaging lens to be provided that controls ghosting occurring between the last lens surface and the imaging element as well as ghosting caused by light reflected from the lens surface nearest the object, and that enables excellent control of various types of aberration occurring at the lenses.

EXPLANATIONS OF LETTERS OR NUMERALS $L_{11}$, $L_{21}$, $L_{31}$ first lens
$L_{12}$, $L_{22}$, $L_{32}$ second lens
$L_{13}$, $L_{23}$, $L_{33}$ third lens
$L_{14}$, $L_{24}$, $L_{34}$ fourth lens
$G_{11}$, $G_{21}$, $G_{31}$ first lens group
$G_{12}$, $G_{22}$, $G_{32}$ second lens group
$G_{13}$, $G_{23}$, $G_{33}$ third lens group
$G_{14}$, $G_{24}$, $G_{34}$ fourth lens group
$L_{321}$ positive lens
$L_{322}$ negative lens
STP aperture stop
IMG image plane

BEST MODE(S) FOR CARRYING OUT THE INVENTION

Preferred embodiments of an imaging lens according to the present invention are explained in detail below.

First Embodiment

An imaging lens according to a first embodiment of the present invention will be described. The imaging lens according to the first embodiment includes, sequentially from an object side, a negative first lens, a positive second lens, a negative third lens, and a positive fourth lens having a convex surface on the image side.

The imaging apparatus according to the first embodiment is assumed to be utilized in a digital video camera. In general, the optical receiving surface of the imaging element in digital video cameras has a high reflectance on the order of several 10 percent; therefore, reflected light causes ghosting to occur. To control the occurrence of such ghosting, special consideration must be given to the configuration of the imaging lens.

The imaging lens according to the first embodiment preferably satisfies the conditional expression below, where θ is the absolute value of the angle between marginal ray of the central beam emitted from the last lens surface and the normal to the lens at the position where the ray is emitted.

$$\theta \geq 30° \quad (1)$$

Conditional expression (1) prescribes the direction in which the last lens surface of the imaging lens re-reflects light reflected by the optical receiving surface of the imaging element. By satisfying conditional expression (1), the light re-reflected by the last lens surface of the imaging lens can reduce the brightness of the ghost light opposite to a direction away from an optical axis. In considering conditional expression (1), parallel plates such as an image plane cover glass and filter are not included at the last lens surface of the imaging lens.

Figure 1:
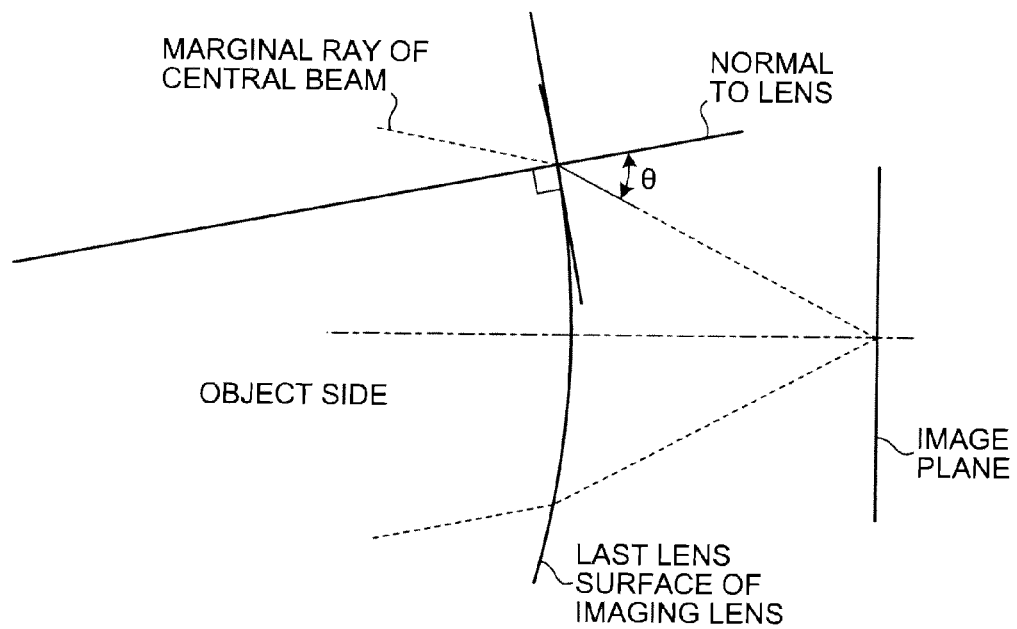
FIG. 1 is a schematic of the ray emitted from the last lens surface of an imaging lens according to a first embodiment.

FIG. 1 is a schematic of the ray emitted from the last lens surface of the imaging lens according to the embodiment. In the schematic, θ represents the absolute value of an angle formed by a marginal ray of the central beam emitted from the last lens surface of the imaging lens and the normal to the lens at the position where the ray is emitted. As depicted in the schematic, if the angle formed by the marginal ray of the central beam emitted from the last lens surface of the imaging lens and the normal to the lens at the position where the ray is emitted is 30° or greater, light reflected to the image side by the last lens surface can be sent in a direction away from the optical axis.

The imaging lens according to the present embodiment preferably satisfies the conditional expression below, where the focal length of the imaging lens is f, and in the imaging lens, the radius of curvature of the lens surface nearest the object is $R_1$.

$$f/R_1 \geq 0.3 \quad (2)$$

Conditional expression (2) prescribes for the imaging lens, a radius of curvature of the lens surface nearest the object. By satisfying conditional expression (2), the radius of curvature of the lens surface nearest the object is reduced. Light reflected by the optical receiving surface of the imaging element is re-reflected by the lens surface nearest the object, but since the radius of curvature is small, the reflected light follows a path different from that of incident light. Hence, upon reaching the imaging element as ghost light, the re-reflected light is significantly diffused, thereby preventing the reflected light from being pronounced as a ghost.

The imaging lens according to the present embodiment can effectively control the occurrence of ghosting, by satisfying conditional expressions (1) and (2).

Further, the imaging lens according to the present embodiment preferably satisfies the conditional expression below, where the refractive index at the d-line of the first lens is $n_1$.

$$n_1 \geq 1.51 \quad (3)$$

Conditional expression (3) prescribes the refraction index of the first lens. Assuming that conditional expressions (1) and (2) are satisfied, by further satisfying conditional expression (3), ghosting occurring between the lens surface nearest the object and the imaging element can be more effectively controlled.

Furthermore, in the imaging lens according to the present embodiment, an aspheric surface is preferably formed on at least one surface of the second lens, whereby spherical aberration can be effectively corrected.

In the imaging lens according to the present embodiment, correction can be made more effective by forming the second lens to be a biconvex lens, i.e., by forming the second lens to be a biconvex lens, the refractive power of the second lens in the imaging lens increases, enabling more effective correction of spherical aberration.

In the imaging lens according to the present embodiment, the first lens may be a meniscus lens disposed with the convex surface on the object side, whereby ghosting caused by light reflected to the image side by the lens surface nearest the object can be reduced.

The imaging lens according to the present embodiment has the characteristics described above; whereby, the imaging lens is a compact, high performance lens capable of controlling ghosting that occurs between the last lens surface and the imaging element and ghosting caused by light reflected to the image side by the lens surface nearest the object and further capable of correcting well various types of aberration occurring at the lenses. By using a lens having a suitable aspheric surface in the configuration of the imaging lens, various types of aberration can be corrected effectively using fewer lens elements and reductions in the size, weight, and cost of the optical system can be facilitated. Furthermore, since the imaging lens does not employ a cemented lens, even if rapid temperature changes occur, no deterioration of optical performance results.

Examples of the imaging lens according to the first embodiment will be described.

First Example

Figure 2:
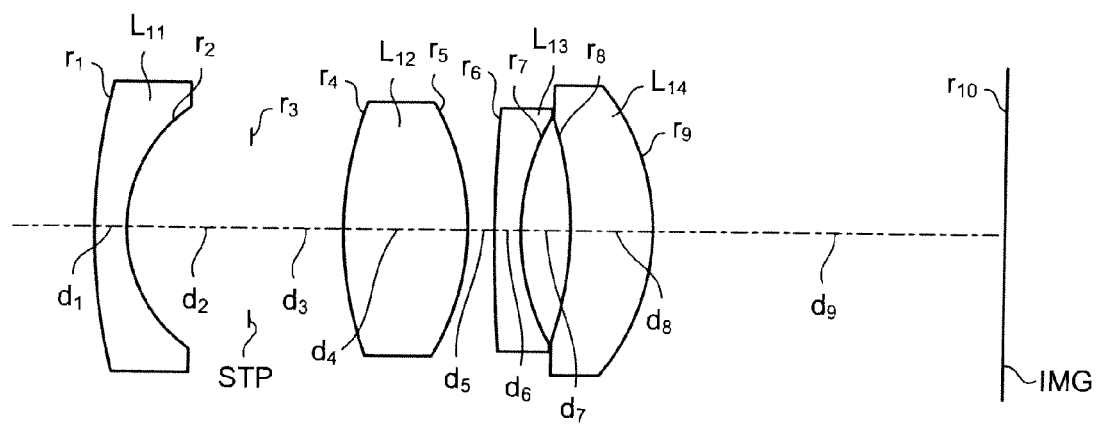
FIG. 2 is a cross sectional view (along the optical axis) of the imaging lens according to a first example.

FIG. 2 is a cross sectional view (along the optical axis) of the imaging lens according to a first example. The imaging lens is a single focus lens that includes, sequentially from a non-depicted object, a first lens $L_{11}$ configured by a negative meniscus lens disposed with the convex surface on the object side, a second lens $L_{12}$ configured by a positive biconvex lens, a negative third lens $L_{13}$, and a fourth lens $L_{14}$ configured by a positive meniscus lens disposed with the convex surface on an image plane IMG side. On both surfaces of the second lens $L_{12}$, an aspheric surface is formed. Further, an aperture stop STP is disposed between the first lens $L_{11}$ and the second lens $L_{12}$. At the image plane IMG, the optical receiving surface of an imaging element such as a CCD and CMOS is disposed.

Various values related to the imaging lens according to the first example are indicated below.
Focal length for entire imaging lens (f)=6.9
F number=2.5
Half angle of view (ω)=28.2°
Object distance (distance from first lens surface of imaging lens to object)=60000
Radius of curvature of first lens surface in imaging lens ($R_1$)= 13.0000
(Values related to conditional expression (1))
Absolute value of angle formed by marginal ray of central beam emitted from last lens surface of imaging lens and normal to lens at position where ray is emitted (θ)=31.2°

(Values related to conditional expression (2))

$$f/R_1 = 0.53$$

Figure 3:
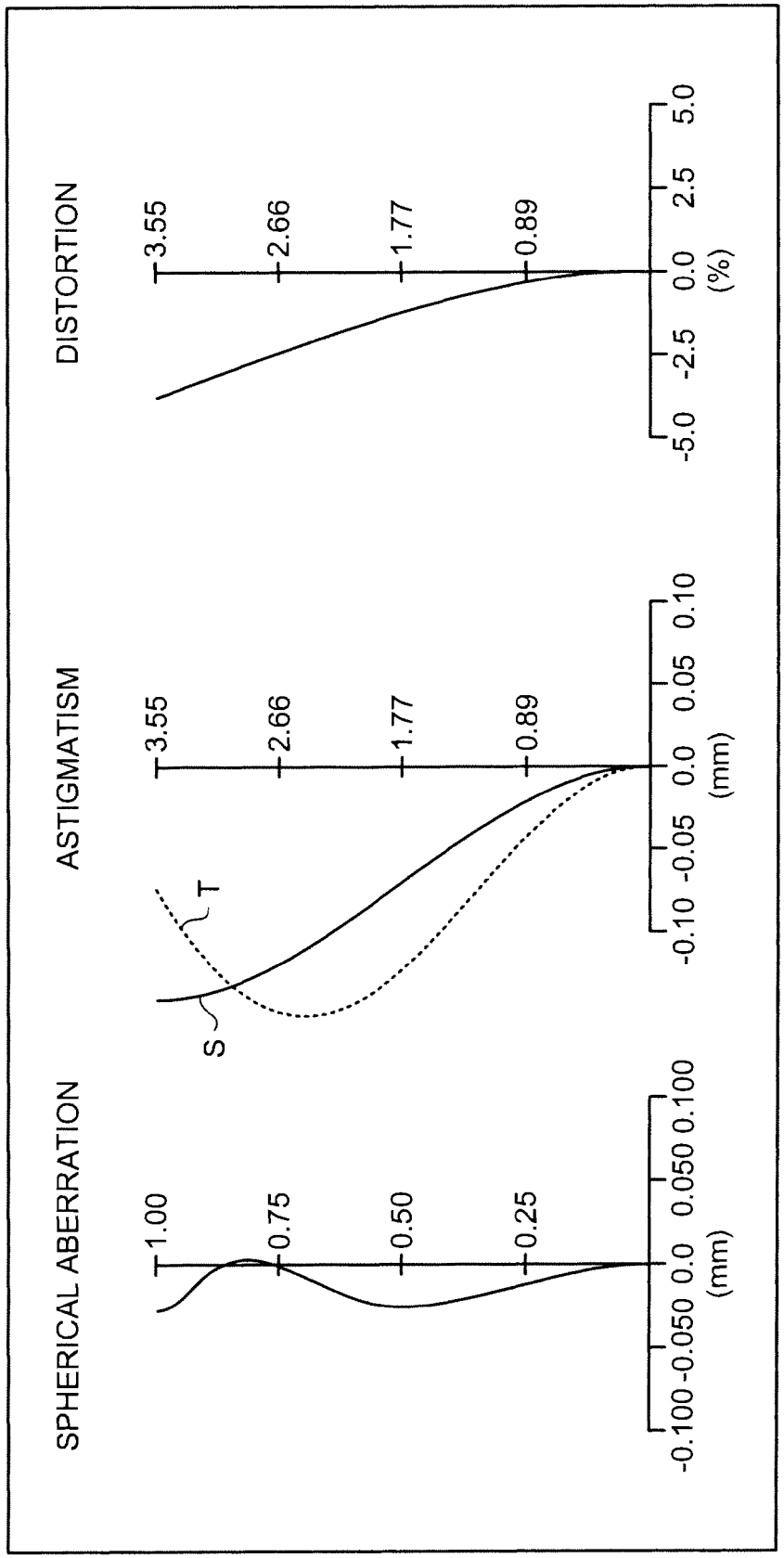
FIG. 3 is a diagram of various types of aberration occurring at d-line (λ=587.56 nm) of the imaging lens according to the first example.

(Values related to conditional expression (3))
Refractive index at d-line of the first lens $L_{11}$
$(n_1) = 1.51680$
$r_1 = 13.0000$
  $d_1 = 0.7$  $nd_1 = 1.51680$  $vd_1 = 64.2$
$r_2 = 3.2383$
  $d_2 = 2.75$
$r_3 = \infty$ (aperture stop)
  $d_3 = 2.1$
$r_4 = 6.3709$ (aspheric surface)
  $d_4 = 2.8$  $nd_2 = 1.69384$  $vd_2 = 53.13$
$r_5 = -4.8172$ (aspheric surface)
  $d_5 = 0.58$
$r_6 = 35.5172$
  $d_6 = 0.6$  $nd_3$  $1.92286$  $vd_3 = 20.88$
$r_7 = 5.2019$
  $d_7 = 1.1$
$r_8 = -8.2593$
  $d_8 = 1.9$  $nd_4 = 1.69680$  $vd_5 = 55.53$
$r_9 = -4.9919$
  $d_9 = 7.9$
$r_{10} = \infty$ (image plane)
Constant of the cone ($\epsilon$) and aspheric coefficients (A, B, C, D, E)
(fourth plane)
$\epsilon = 0, A = 0,$
$B = -1.68564 \times 10^{-3}, C = 1.05730 \times 10^{-4},$
$D = -2.07866 \times 10^{-5}, E = 1.76253 \times 10^{-6}$
(fifth plane)
$\epsilon = 0, A = 0,$
$B = 2.66271 \times 10^{-3}, C = 1.70415 \times 10^{-4},$
$D = -4.39613 \times 10^{-5}, E = 3.58341 \times 10^{-6}$ FIG. 3 is a diagram of various types of aberration occurring at d-line ($\lambda = 587.56$ nm) of the imaging lens according to the first example. Reference symbols S and T used with respect to astigmatism indicate aberration in the sagittal direction and in the tangential direction, respectively.

Second Example

Figure 4:
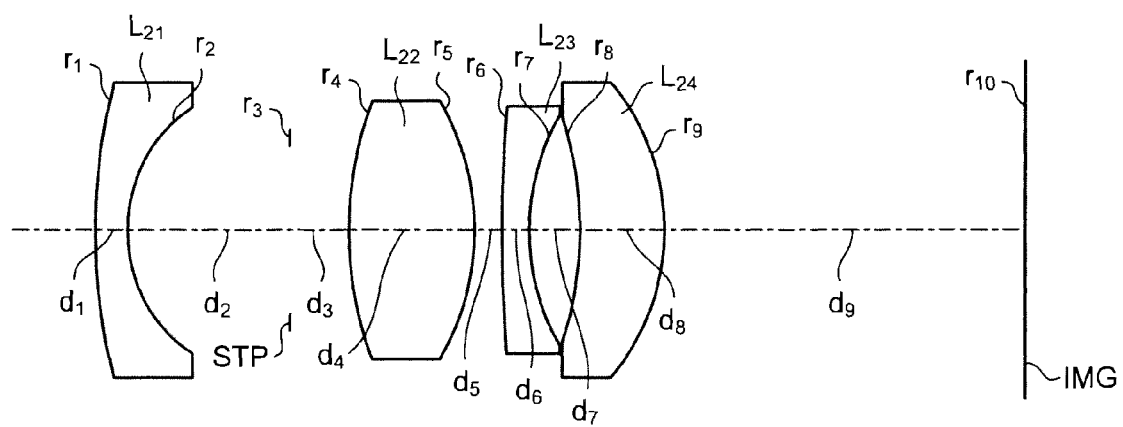
FIG. 4 is a cross sectional view (along the optical axis) of the imaging lens according to a second example.

FIG. 4 is a cross sectional view (along the optical axis) of the imaging lens according to a second example. The imaging lens is a single focus lens that includes, sequentially from a non-depicted object, a first lens $L_{21}$ configured by a negative meniscus lens disposed with the convex surface on the object side, a second lens $L_{22}$ configured by a positive biconvex lens, a negative third lens $L_{23}$, and a fourth lens $L_{24}$ configured by a positive meniscus lens disposed with the convex surface on the image plane IMG side. On both surfaces of the second lens $L_{22}$ and on the surface on the image plane IMG side of the fourth lens $L_{24}$, an aspheric surface is formed. Further, an aperture stop STP is disposed between the first lens $L_{21}$ and the second lens $L_{22}$. At the image plane IMG, the optical receiving surface of an imaging element such as a CCD and CMOS is disposed.

Various values related to the imaging lens according to the second example are indicated below.
Focal length for entire imaging lens (f)=6.9
F number=2.5
Half angle of view ($\omega$)=28.2°
Object distance (distance from first lens surface of imaging lens to object)=60000
Radius of curvature of first lens surface in imaging lens ($R_1$)= 13.0000

(Values related to conditional expression (1))
Absolute value of angle formed by marginal ray of central beam emitted from last lens surface of imaging lens and normal to lens at position where ray is emitted ($\theta$)=31.8°
(Values related to conditional expression (2))

$$f/R_1 = 0.53$$

Figure 5:
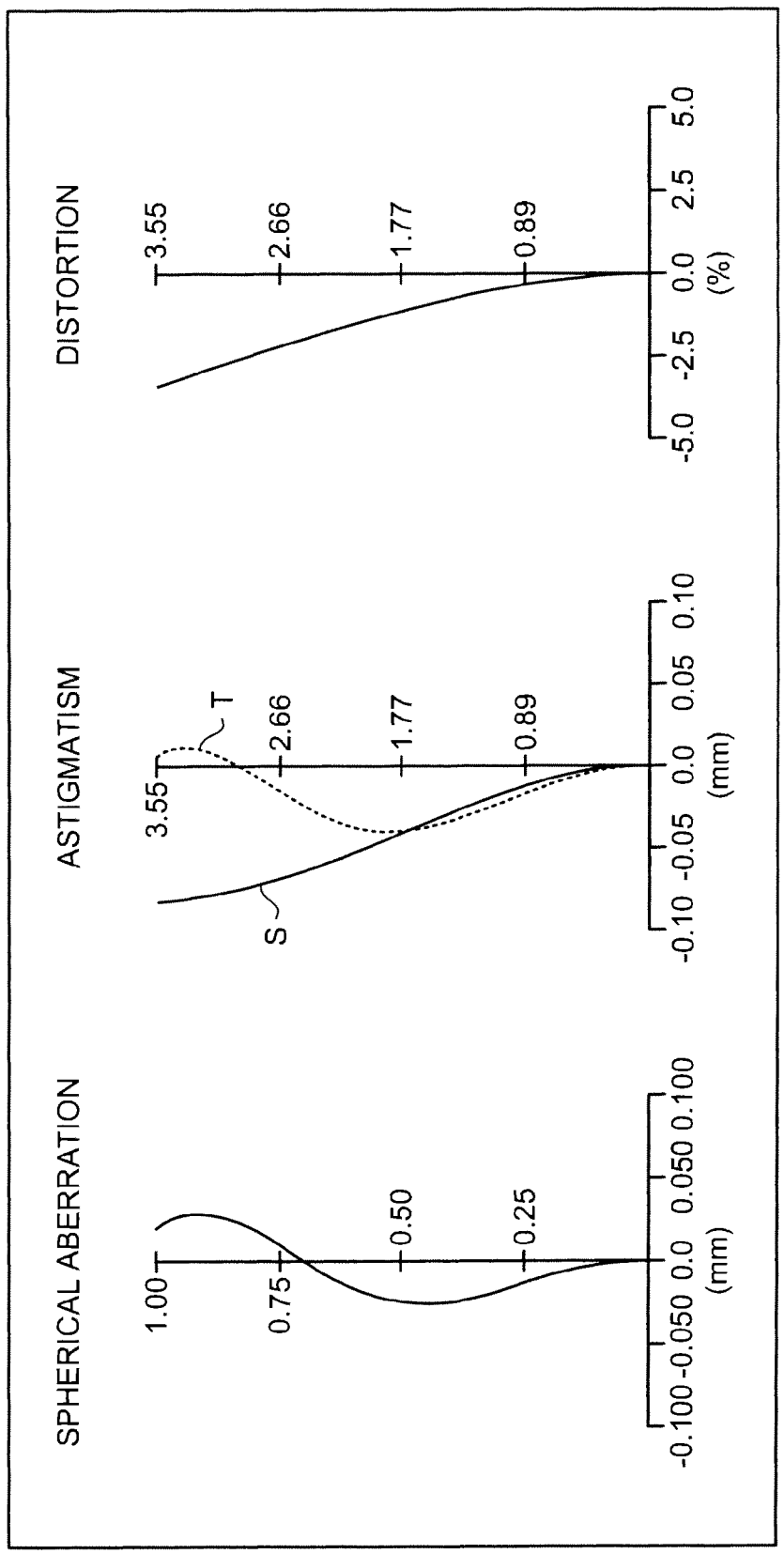
FIG. 5 is a diagram of various types of aberration occurring at d-line (λ=587.56 nm) of the imaging lens according to the second example.

(Values related to conditional expression (3))
Refractive index at d-line of the first lens $L_{21}$
$(n_1) = 1.51680$
$r_1 = 13.0000$
  $d_1 = 0.7$  $nd_1 = 1.51680$  $vd_1 = 64.2$
$r_2 = 3.2277$
  $d_2 = 3.55$
$r_3 = \infty$ (aperture stop)
  $d_3 = 1.3$
$r_4 = 6.0200$ (aspheric surface)
  $d_4 = 2.8$  $nd_2 = 1.69384$  $vd_2 = 53.13$
$r_5 = -5.0752$ (aspheric surface)
  $d_5 = 0.58$
$r_6 = 35.5172$
  $d_6 = 0.6$  $nd_3 = 1.92286$  $vd_3 = 20.88$
$r_7 = 5.2019$
  $d_7 = 1.1$
$r_8 = -8.0171$
  $d_8 = 1.9$  $nd_4 = 1.69384$  $vd_5 = 53.13$
$r_9 = -4.8484$ (aspheric surface)
  $d_9 = 7.9$
$r_{10} = \infty$ (image plane)
Constant of the cone ($\epsilon$) and aspheric coefficients (A, B, C, D, E)
(fourth plane)
$\epsilon = 0, A = 0,$
$B = -6.07493 \times 10^{-4}, C = -1.37313 \times 10^{-4},$
$D = 4.24541 \times 10^{-5}, E = -1.98261 \times 10^{-6}$
(fifth plane)
$\epsilon = 0, A = 0,$
$B = 3.78002 \times 10^{-3}, C = -1.11800 \times 10^{-4},$
$D = 2.78731 \times 10^{-5}, E = -4.91814 \times 10^{7}$
(ninth plane)
$\epsilon = 0, A = 0,$
$B = -1.74764 \times 10^{-4}, C = 3.23165 \times 10^{-5},$
$D = 3.01336 \times 10^{-7}, E = -5.00643 \times 10^{-7}$ FIG. 5 is a diagram of various types of aberration occurring at d-line ($\lambda = 587.56$ nm) of the imaging lens according to the second example. Reference symbols S and T used with respect to astigmatism indicate aberration in the sagittal direction and in the tangential direction, respectively.

Third Example

Figure 6:
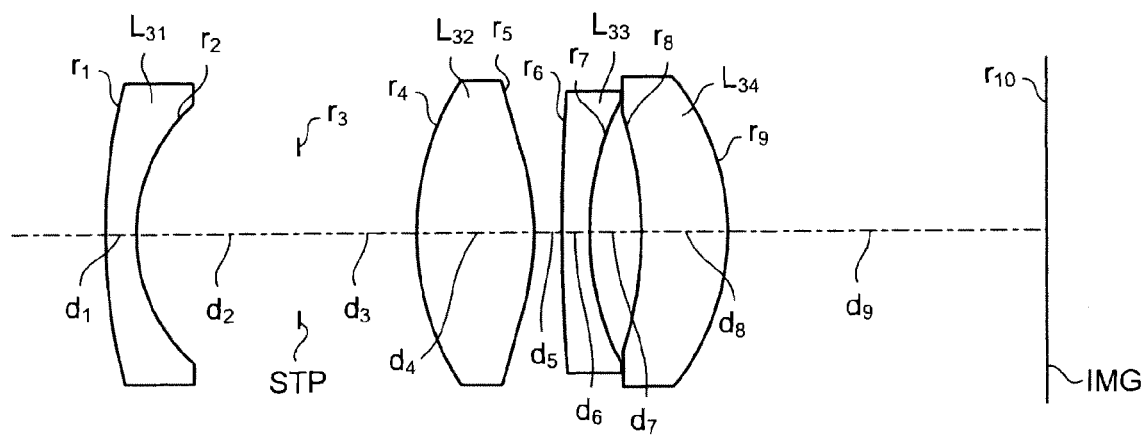
FIG. 6 is a cross sectional view (along the optical axis) of the imaging lens according to a third example.

FIG. 6 is a cross sectional view (along the optical axis) of the imaging lens according to a third example. The imaging lens is a single focus lens that includes, sequentially from a non-depicted object, a first lens $L_{31}$ configured by a negative meniscus lens disposed with the convex surface on the object side, a second lens $L_{32}$ configured by a positive biconvex lens, a negative third lens $L_{33}$, and a fourth lens $L_{34}$ configured by a positive meniscus lens disposed with the convex surface on the image plane IMG side. On both surfaces of the second lens $L_{32}$ and of the fourth lens $L_{34}$, respectively, an aspheric surface is formed. Further, an aperture stop STP is disposed between the first lens $L_{31}$ and the second lens $L_{32}$. At the image plane IMG, the optical receiving surface of an imaging element such as a CCD and CMOS is disposed.

Various values related to the imaging lens according to the third example are indicated below.

Focal length for entire imaging lens (f)=6.8
F number=2.0
Half angle of view (ω)=28.6°
Object distance (distance from first lens surface of imaging lens to object)=60000
Radius of curvature of first lens surface in imaging lens $(R_1)$=15.2000

(Values related to conditional expression (1))
Absolute value of angle formed by marginal ray of central beam emitted from last lens surface of imaging lens and normal to lens at position where ray is emitted (θ)=36.5°
(Values related to conditional expression (2))

$f/R_1$=0.45

Figure 7:
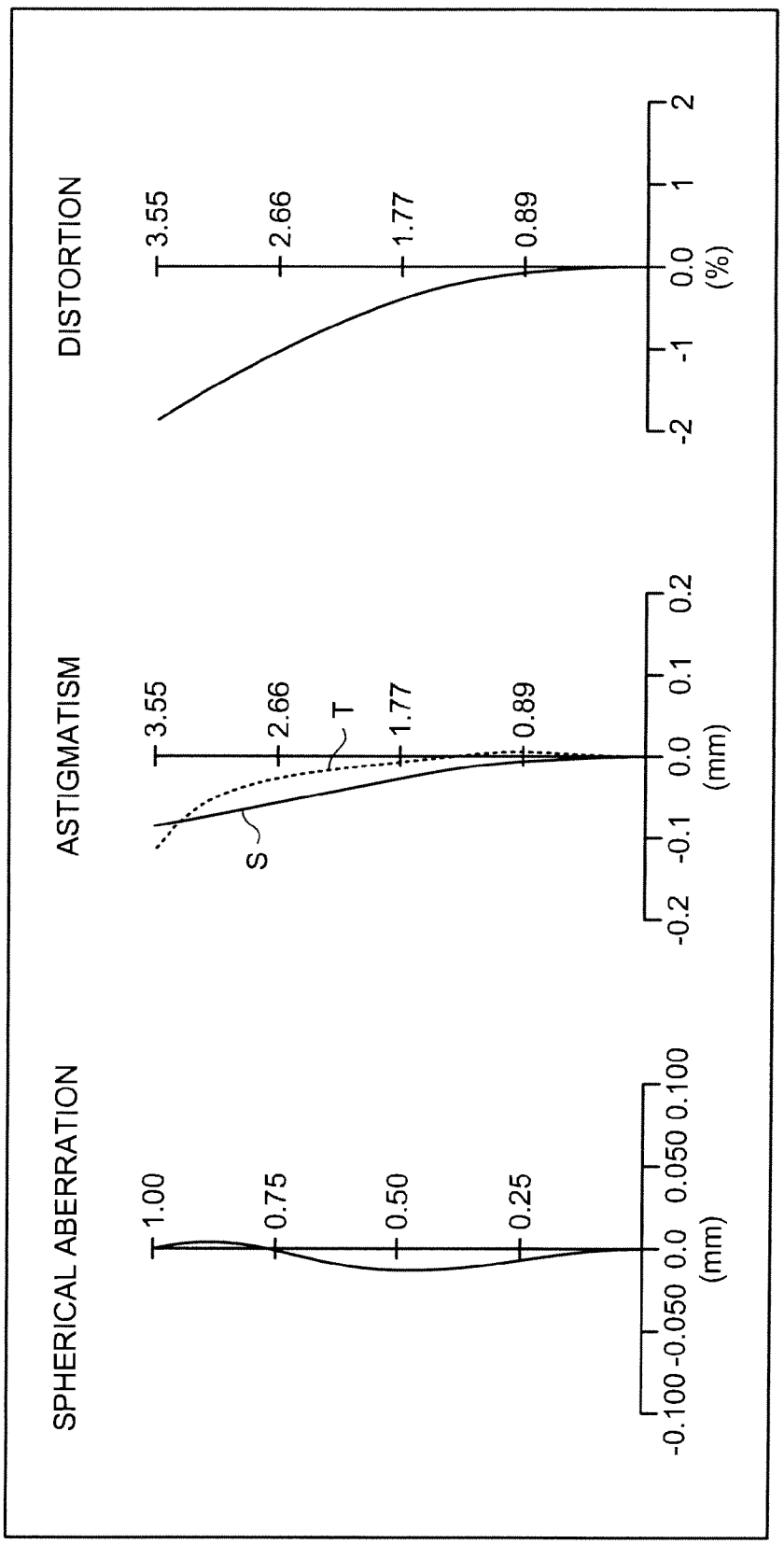
FIG. 7 is a diagram of various types of aberration occurring at d-line (λ=587.56 nm) of the imaging lens according to the third example.

(Values related to conditional expression (3))
Refractive index at d-line of first lens $L_{31}$ ($n_1$)=1.51680
$r_1$=15.2000
    $d_1$=0.7 $nd_1$=1.48749 $vd_1$=70.2
$r_2$=4.0055
    $d_2$=3.78
$r_3$=∞ (aperture stop)
    $d_3$=2.75
$r_4$=6.0760 (aspheric surface)
    $d_4$=2.7 $nd_2$=1.69350 $vd_2$=53.2
$r_5$=−5.6341 (aspheric surface)
    $d_5$=0.69
$r_6$=175.6315
    $d_6$=0.6 $nd_3$=1.92286 $vd_3$=20.88
$r_7$=5.8520
    $d_7$=1.2
$r_8$=−7.6570 (aspheric surface)
    $d_8$=2.0 $nd_4$=1.69350 $vd_5$=53.2
$r_9$=−4.7627 (aspheric surface)
    $d_9$=7.1
$r_{10}$=∞ (image plane)
Constant of the cone (ε) and aspheric coefficients (A, B, C, D, E)
(fourth plane)
ε=0, A=0,
B=−6.46315×10$^{-4}$, C=−6.71783×10$^{-5}$,
D=1.21713×10$^{-5}$, E=−4.66102×10$^{-7}$
(fifth plane)
ε=0, A=0,
B=3.63949×10$^{-3}$, C=−1.85466×10$^{-4}$,
D=1.94283×10$^{-5}$, E=−6.28447×10$^{-7}$
(eighth plane)
ε=0, A=0,
B=2.78523×10$^{-3}$, C=−3.60573×10$^{-4}$,
D=6.20447×10$^{-5}$, E=−3.47557×10$^{-6}$
(ninth plane)
ε=0, A=0,
B=1.76355×10$^{-3}$, C=−9.05321×10$^{-5}$,
D=1.56017×10$^{-5}$, E=−4.63406×10$^{-7}$ FIG. 7 is a diagram of various types of aberration occurring at d-line (λ=587.56 nm) of the imaging lens according to the third example. Reference symbols S and T used with respect to astigmatism indicate aberration in the sagittal direction and in the tangential direction, respectively.

Among the values for the examples above, $r_1$, $r_2$, . . . indicate radii of curvature for each lens, diaphragm surface, etc.; $d_1$, $d_2$, . . . indicate the thickness of the lenses, diaphragm, etc. or the distance between surfaces thereof; $nd_1$, $nd_2$, . . . indicate the refraction index of each lens with respect to the d-line (λ=587.56 nm); $vd_1$, $vd_2$, . . . indicate the Abbe number with respect to the d-line (λ=587.56 nm) of each lens.

Each of the aspheric surfaces above can be expressed by the following equation, where with respect to the vertex as a point of reference, H is the height perpendicular to the optical axis and X(H) is the change in H along the direction of optical axis.

$$X(H) = \frac{H^2/R}{1+\sqrt{1-(\varepsilon H^2/R^2)}} + AH^2 + BH^4 + CH^6 + DH^8 + EH^{10} \quad \text{[Equation 1]}$$

R is paraxial radii of curvature; c is constant of the cone; A, B, C, D, and E are the second, fourth, sixth, eighth, and tenth aspheric coefficients, respectively.

As described, by satisfying the conditional expressions above, the examples of the imaging lens herein are able to control ghosting occurring between the lens surface nearest the object and the imaging element and ghosting caused by light reflected to the image side by the lens surface nearest the object, without sacrifice to the compact-size of the optical system or high optical performance.

Further, since the examples of the imaging lens herein employ a lens having a suitable aspheric surface, effective correction of various types of aberration can be performed using fewer lens elements and reductions in the size, weight, and cost of the optical system can be facilitated.

As the examples of the imaging lens herein do not employ a cemented lens, even if rapid temperature changes occur, no deterioration of optical performance results.

Second Embodiment

An imaging lens according to a second embodiment will be described. The imaging lens according to the second embodiment includes sequentially from the object side, a positive first lens group, a negative second lens group, a positive third lens group, and a fourth lens group configured by a meniscus lens disposed with the concave surface on the object side.

The imaging lens according to the second embodiment, similar to the first embodiment, is assumed to be utilized in a digital video camera. In general, the optical receiving surface of the imaging element in digital video cameras has a high reflectance on the order of several 10 percent; therefore, reflected light causes ghosting to occur. To control the occurrence of such ghosting, special consideration must be given to the configuration of the imaging lens.

The imaging lens according to the present embodiment, preferably satisfies the conditional expression below, where BF is the back focal length and L is the distance from the first lens surface in the imaging lens to the image plane.

$$BF/L \geq 0.3 \quad (4)$$

Conditional expression (4) prescribes a condition to control the occurrence of ghosting between the last lens surface of the imaging lens and the imaging element. By satisfying conditional expression (4), the last lens surface of the imaging lens is disposed at a position that is somewhat away from the imaging element disposed at the position of the image plane. Consequently, light reflected by the optical receiving surface of the imaging element is significantly dispersed, reaches the last lens surface of the imaging lens and is again reflected; therefore the reflected beam, which is the cause of ghosting, is significantly dispersed, reducing the brightness thereof and thereby, preventing the image from being negatively affected.

The imaging lens according to the present embodiment preferably satisfies the conditional expression below, where the absolute value of an angle formed by a marginal ray of the central beam emitted from the last lens surface of the imaging lens and the normal to the lens at the position where the ray is emitted is θ.

$$\theta \geq 15.0°  \quad (5)$$

Conditional expression (5) prescribes the direction in which the last lens surface of the imaging lens re-reflects the light reflected by the optical receiving surface of the imaging element. By satisfying conditional expression (5), the light re-reflected by the last lens surface of the imaging lens can further reduce the brightness of the ghost light opposite to a direction away from an optical axis.

Figure 8:
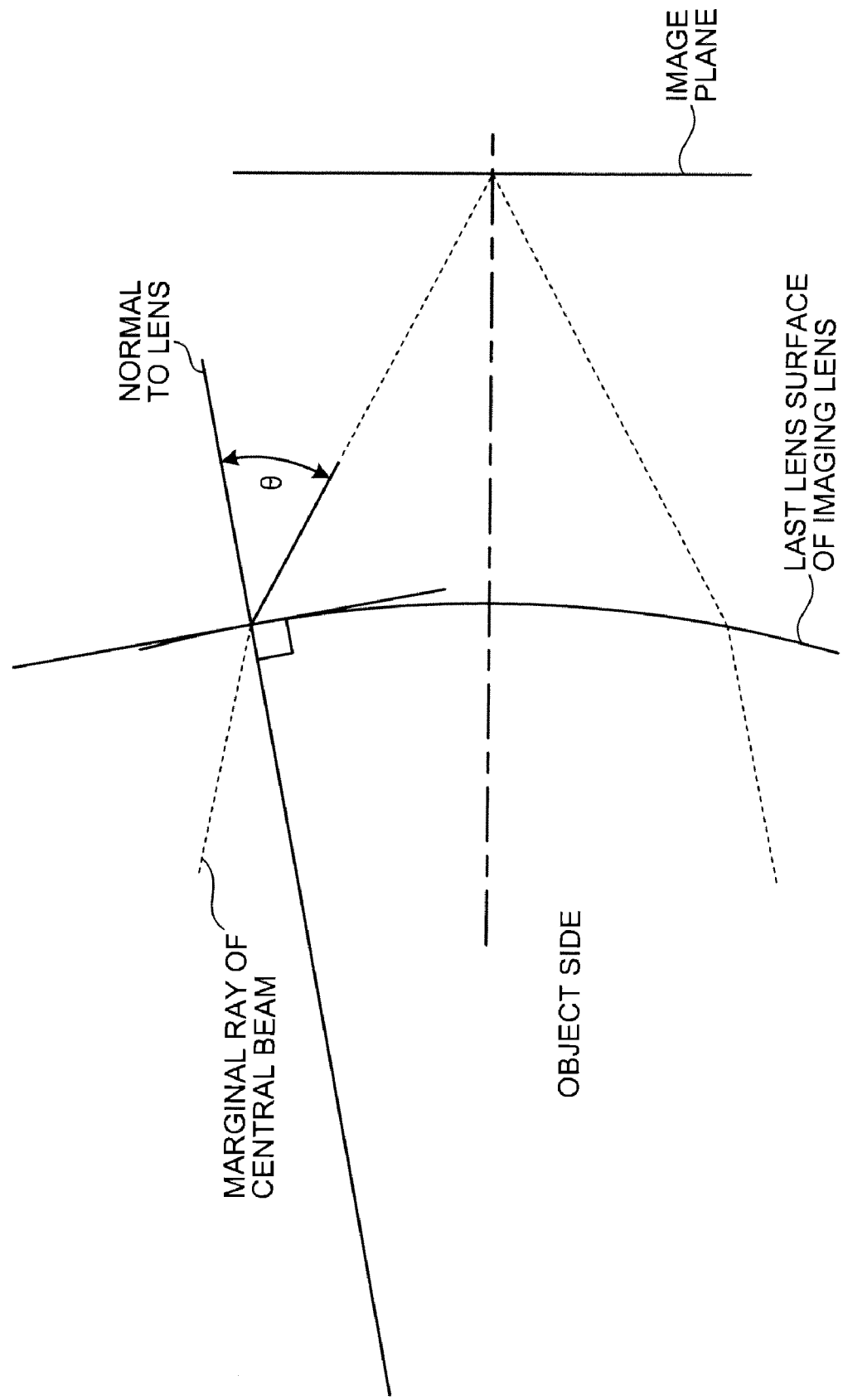
FIG. 8 is a schematic of the ray emitted from the last lens surface of an imaging lens according to a second embodiment.

FIG. 8 is a schematic of the ray emitted from the last lens surface of an imaging lens according to an embodiment of the invention. In the schematic, θ represents the absolute value of an angle formed by a marginal ray of the central beam emitted from the last lens surface of the imaging lens and the normal to the lens at the position where the ray is emitted. As depicted in the schematic, if the angle formed by the marginal ray of the central beam emitted from the last lens surface of the imaging lens and the normal to the lens at the position where the ray is emitted is 15° or greater, reflected light from the optical receiving surface of the imaging element and re-reflected by the last lens surface can be sent in a direction away from the optical axis.

By satisfying conditional expressions (4) and (5), the imaging lens according to the present embodiment can effectively control the occurrence of ghosting. In considering conditional expressions (4) and (5), parallel plates such as an image plane cover glass and filter are not included at the last lens surface of the imaging lens.

The imaging lens according to the present embodiment preferably satisfies the conditional expression below, where the focal length of the imaging lens is f and the radius of curvature of a first lens surface in the imaging lens is $R_1$.

$$f/R_1 \geq 0.5 \quad (6)$$

Conditional expression (6) prescribes for the imaging lens, a radius of curvature of the lens surface nearest the object. By satisfying conditional expression (6), the radius of curvature of the lens surface nearest the object is reduced. Light reflected by the optical receiving surface of the imaging element is re-reflected by the lens surface nearest the object, but since the radius of curvature is small, the reflected light follows a path different from that of incident light. Hence, upon reaching the imaging element as ghost light, the re-reflected light is a significantly diffused, thereby preventing the reflected light from being pronounced as a ghost.

The imaging lens according to the present embodiment preferably satisfies the conditional expression below, where the interval between the third lens group and the fourth lens group is $D_{3-4}$.

$$D_{3-4}/f \geq 0.08 \quad (7)$$

Conditional expression (7) prescribes the distance between the third lens group and the fourth lens group. By satisfying conditional expression (7), a compact imaging lens can be achieved as well as excellent correction of field curvature.

The imaging lens according to the present embodiment preferably satisfies the conditional expression below, where the refractive index at d-line of the third lens group is $n_3$.

$$n_3 \geq 1.72 \quad (8)$$

Conditional expression (8) prescribes the refraction index for the third lens group. By satisfying conditional expression (8), the flatness of the image plane can be ensured and image formation performance can be maintained by keeping the position of the image plane fixed. In particular, since for pan focus lenses, consistency of the position of the image plane is preferable, the condition prescribed by conditional expression (8) is particularly important. Furthermore, below the lower limit of conditional expression (8), the flatness of the image plane degrades and thus, is undesirable.

The imaging lens according to the present embodiment preferably satisfies the conditional expression below, where the focal length of image-side surface of the third lens group is $f_3$.

$$2.0 \geq f/f_3 \geq 1.35 \quad (9)$$

Conditional expression (9) prescribes, for the imaging lens, the focal length of image-side surface of the third lens group. By satisfying conditional expression (9), spherical aberration primarily occurring at the second lens group can be corrected well. Below the lower limit of conditional expression (9), spherical aberration primarily occurring at the second lens group cannot be entirely corrected. Meanwhile, above the upper limit of conditional expression (9), overcorrection occurs and thus, is undesirable.

If the third lens group of the imaging lens according to the present embodiment is configured by a biconvex lens, more effective correction is possible. That is, by configuring the third lens group by a biconvex lens, the refractive power of the third lens group increases, whereby spherical aberration occurring at the second lens group can be corrected more effectively.

The imaging lens according to the present embodiment has the characteristics described above; whereby, the imaging lens is a compact, high performance lens capable of controlling ghosting that occurs between the last lens surface and the imaging element and ghosting caused by light reflected by the lens surface nearest the object and further capable of correcting well various types of aberration occurring at the lenses. By using a lens having a suitable aspheric surface in the configuration of the imaging lens, various types of aberration can be corrected effectively using fewer lens elements and reductions in the size, weight, and cost of the optical system can be facilitated. Furthermore, since the imaging lens does not employ a cemented lens, even if rapid temperature changes occur, no deterioration of optical performance results.

Examples of the imaging lens according to the second embodiment will be described.

Fourth Example

Figure 9:
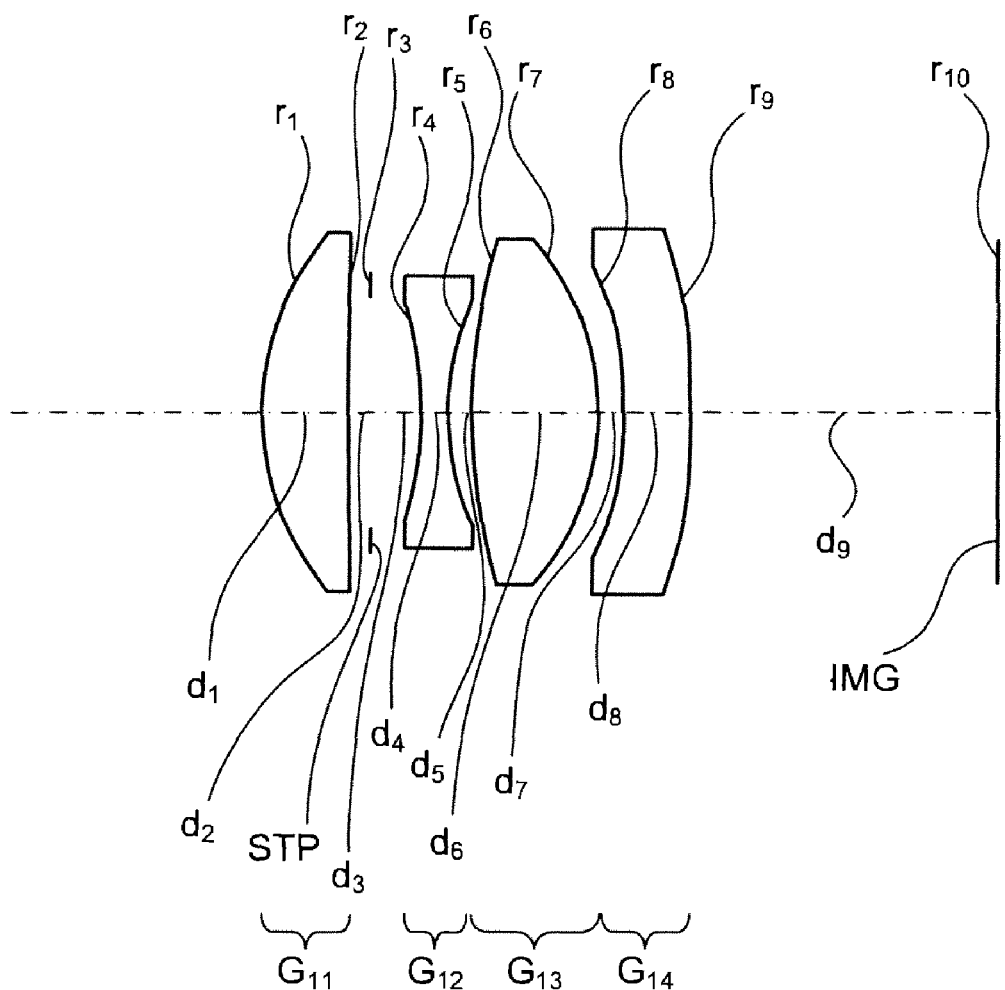
FIG. 9 is a cross sectional view (along the optical axis) of the imaging lens according to a fourth example.

FIG. 9 is a cross sectional view (along the optical axis) of the imaging lens according to a fourth example. The imaging lens is a single focus lens that includes, sequentially from a non-depicted object, a first lens group $G_{11}$ configured by a positive lens, a second lens group $G_{12}$ configured by a negative lens, a third lens group $G_{13}$ configured by a positive biconvex lens, and a fourth lens group $G_{14}$ configured by a meniscus lens disposed with the concave surface on the object side. On both surfaces of the fourth lens group $G_{14}$ an aspheric surface is formed. An aperture stop STP is disposed between the first lens group $G_{11}$ and the second lens group $G_{12}$. Further, at the image plane IMG, the optical receiving surface of an imaging element such as a CCD and CMOS is disposed.

Various values related to the imaging lens according to the fourth example are indicated below.

Focal length for entire imaging lens (f)=12.0
Focal length of image-side surface of third lens group $G_{13}$ ($f_3$)=6.57

F number=2.0
Half angle of view (ω)=17.5°
Object distance (distance from first lens surface of imaging lens to object)=11260
Back focal length of imaging lens (BF)=6.88
Distance from first lens surface in imaging lens to image plane (L)=16.47
Radius of curvature of first lens surface in imaging lens ($R_1$)= 6.3
Interval between third lens group $G_{13}$ and fourth lens group $G_{14}$ ($D_{3-4}$)=0.56
(Values related to conditional expression (4))

$$BF/L=0.41$$

(Values related to conditional expression (5))
Absolute value of angle formed by marginal ray of central beam emitted from last lens surface of imaging lens and normal to lens at position where ray is emitted (θ)=19.7
(Values related to conditional expression (6))

$$f/R_1=1.90$$

(Values related to conditional expression (7))

$$D_{3-4}/f=0.047$$

(Values related to conditional expression (8))
Refractive index at d-line of the third lens group $G_{13}$ ($n_3$)= 1.88300
(Values related to conditional expression (9))

$$f/f_3=1.83$$

Figure 10:
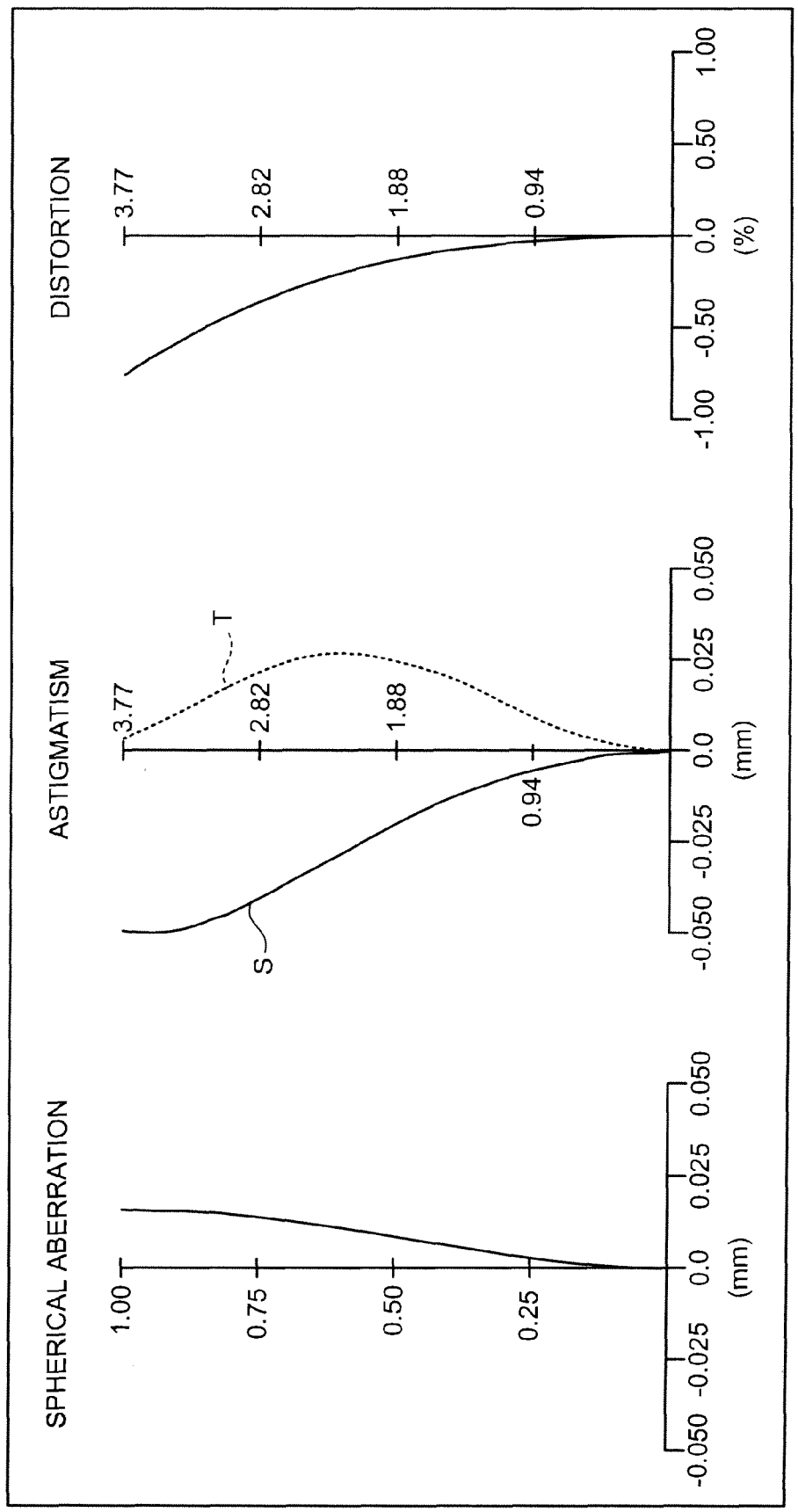
FIG. 10 is a diagram of various types of aberration occurring at d-line (λ=587.56 nm) of the imaging lens according to the fourth example.

$r_1$=6.3
　$d_1$=1.9 $nd_1$=1.77250 $vd_1$=49.60
$r_2$=63.75
　$d_2$=0.52
$r_3$=∞ (aperture stop)
　$d_3$=1.12
$r_4$=−8.672
　$d_4$=0.6 $nd_2$=1.84666 $vd_2$=23.78
$r_5$=6.05
　$d_5$=0.54
$r_6$=13.65
　$d_6$=2.85 $nd_3$=1.88300 $vd_3$=40.78
$r_7$=−5.77
　$d_7$=0.56
$r_8$=−14.114 (aspheric surface)
　$d_8$=1.5 $nd_4$=1.58313 $vd_4$=59.38
$r_9$=−57.581 (aspheric surface)
　$d_9$=6.88
$r_{10}$=∞ (image plane)
Constant of the cone (ε) and aspheric coefficients (A, B, C, D, E)
(eighth plane)
ε=13.1439, A=0,
B=−3.06922×10$^{-3}$, C=8.30265×10$^{-5}$,
D=−3.27459×10$^{-6}$, E=7.22622×10$^{-7}$
(ninth plane)
ε=34.0793, A=0,
B=−2.96779×10$^{-3}$, C=5.76757×10$^{-5}$,
D=−8.34737×10$^{-7}$, E=1.35585×10$^{-7}$ FIG. 10 is a diagram of various types of aberration occurring at d-line (λ=587.56 nm) of the imaging lens according to the fourth example. Reference symbols S and T used with respect to astigmatism indicate aberration in the sagittal direction and in the tangential direction, respectively.

Fifth Example

Figure 11:
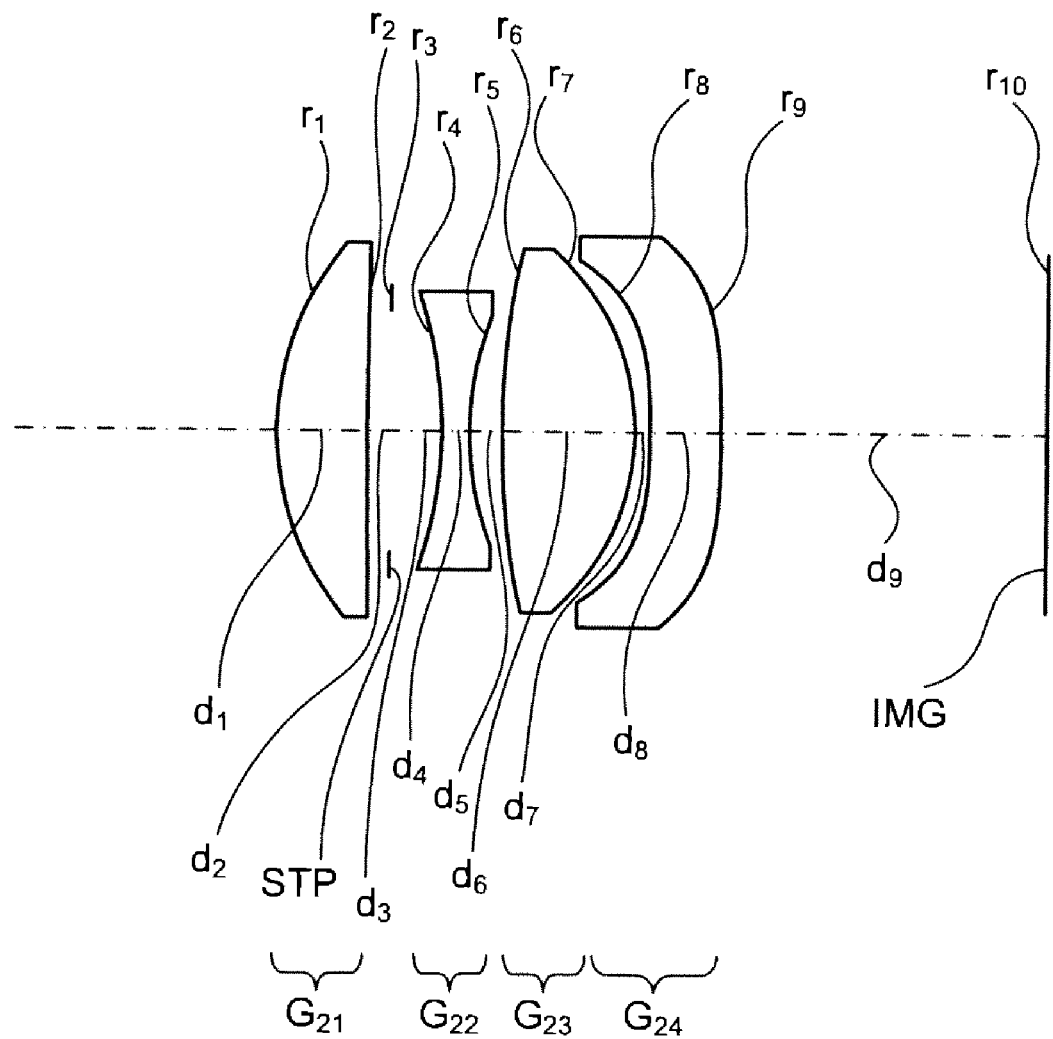
FIG. 11 is a cross sectional view (along the optical axis) of the imaging lens according to a fifth example.

FIG. 11 is a cross sectional view (along the optical axis) of the imaging lens according to a fifth example. The imaging lens is a single focus lens that includes, sequentially from a non-depicted object, a first lens group $G_{21}$ configured by a positive lens, a second lens group $G_{22}$ configured by a negative lens, a third lens group $G_{23}$ configured by a positive biconvex lens, and a fourth lens group $G_{24}$ configured by a meniscus lens disposed with the concave surface on the object side. On both surfaces of the fourth lens group $G_{24}$, an aspheric surface is formed. An aperture stop STP is disposed between the first lens group $G_{21}$ and the second lens group $G_{22}$. Further, at the image plane IMG, the optical receiving surface of an imaging element such as a CCD and CMOS is disposed.

Various values related to the imaging lens according to the fifth example are indicated below.
Focal length for entire imaging lens (f)=12.13
Focal length of image-side surface of third lens group $G_{23}$ ($f_3$)=6.82
F number=2.0
Half angle of view (ω)=17.5°
Object distance (distance from first lens surface of imaging lens to object)=11260
Back focal length of imaging lens (BF)=6.87
Distance from first lens surface in imaging lens to image plane (L)=16.31
Radius of curvature of first lens surface in imaging lens ($R_1$)= 6.12
Interval between third lens group $G_{23}$ and fourth lens group $G_{24}$ ($D_{3-4}$)=0.33
(Values related to conditional expression (4))

$$BF/L=0.42$$

(Values related to conditional expression (5))
Absolute value of angle formed by marginal ray of central beam emitted from last lens surface of imaging lens and normal to lens at position where ray is emitted (θ)=21.5°
(Values related to conditional expression (6))

$$f/R_1=1.98$$

(Values related to conditional expression (7))

$$D_{3-4}/f=0.027$$

(Values related to conditional expression (8))
refractive index at d-line of third lens group $G_{23}$ ($n_3$)=1.74320
(Values related to conditional expression (9))

$$f/f_3=1.78$$

$r_1$=6.12
　$d_1$=1.9 $nd_1$=1.77250 $vd_1$=49.60
$r_2$=104.5
　$d_2$=0.51
$r_3$=∞ (aperture stop)
　$d_3$=1.07
$r_4$=−9.129
　$d_4$=0.6 $nd_2$=1.84666 $vd_2$=23.78
$r_5$=6.685
　$d_5$=0.68
$r_6$=17.86
　$d_6$=2.85 $nd_3$=1.74320 $vd_3$=49.31
$r_7$=−5.05
　$d_7$=0.33
$r_8$=−15.346 (aspheric surface)
　$d_8$=1.5 $nd_4$=1.58313 $vd_4$=59.38
$r_9$=−57.581 (aspheric surface)
　$d_9$=6.87
$r_{10}$=∞ (image plane)

Figure 12:
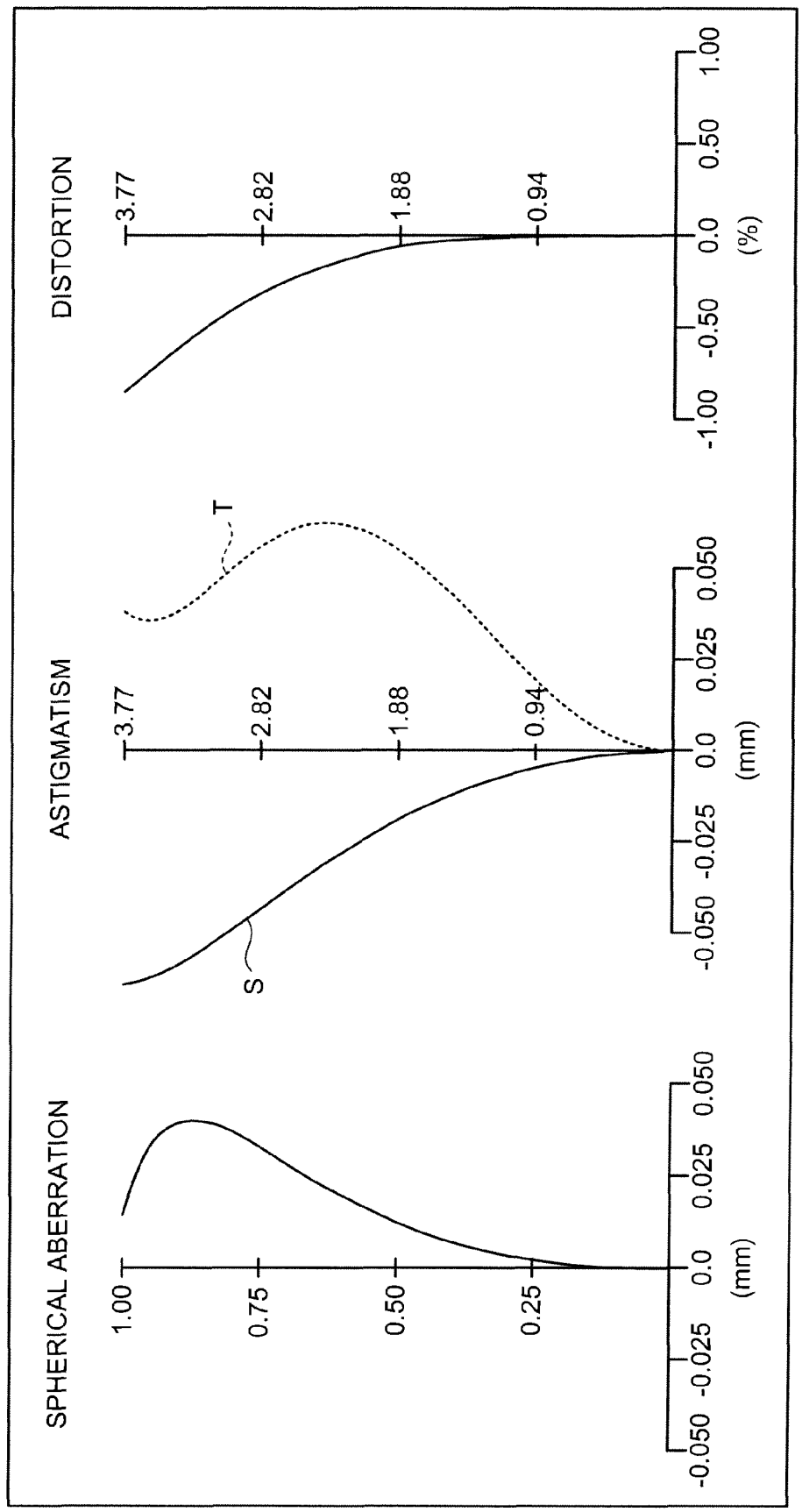
FIG. 12 is a diagram of various types of aberration occurring at d-line (λ=587.56 nm) of the imaging lens according to the fifth example.

Constant of the cone ($\epsilon$) and aspheric coefficients (A, B, C, D, E)
(eighth plane)
$\epsilon=8.2197$, A=0,
B=$-4.87236\times10^{-3}$, C=$-8.15423\times10^{-5}$,
D=$1.38624\times10^{-6}$, E=$-1.20506\times10^{-7}$
(ninth plane)
$\epsilon=50.0116$, A=0,
B=$-4.11475\times10^{-3}$, C=$-1.95573\times10^{-5}$,
D=$4.54797\times10^{-6}$, E=$-1.58752\times10^{-7}$ FIG. 12 is a diagram of various types of aberration occurring at d-line ($\lambda=587.56$ nm) of the imaging lens according to the fifth example. Reference symbols S and T used with respect to astigmatism indicate aberration in the sagittal direction and in the tangential direction, respectively.

Sixth Example

Figure 13:
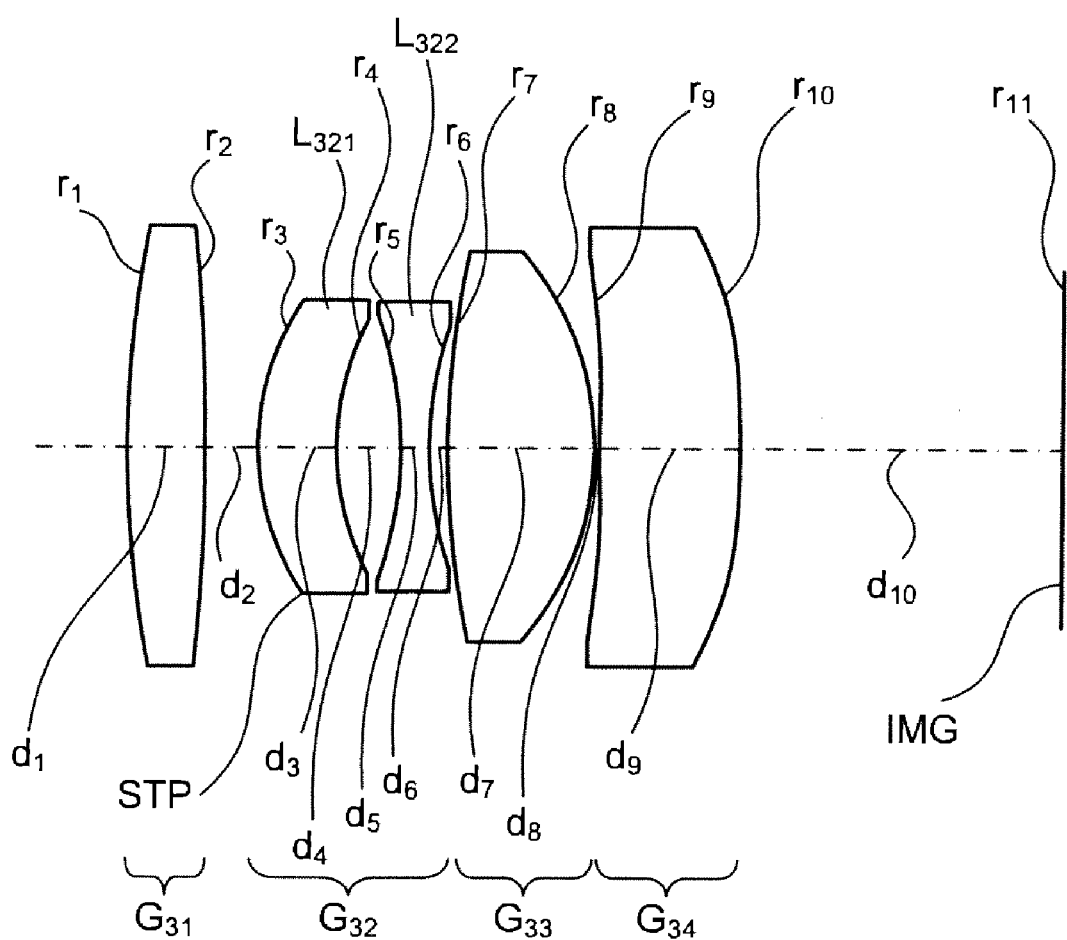
FIG. 13 is a cross sectional view (along the optical axis) of the imaging lens according to a sixth example.

FIG. 13 is a cross sectional view (along the optical axis) of the imaging lens according to a sixth example. The imaging lens is a single focus lens that includes, sequentially from a non-depicted object, a first lens group $G_{31}$ configured by a positive lens, a second lens group $G_{32}$ configured by a negative lens, a third lens group $G_{33}$ configured by a positive biconvex lens, and a fourth lens group $G_{34}$ configured by a meniscus lens disposed with the concave surface on the object side. The second lens group $G_{32}$ includes, sequentially from the object side, a positive lens $L_{321}$ and a negative lens $L_{322}$. On both surfaces of the fourth lens group $G_{34}$, an aspheric surface is formed. An aperture stop STP is disposed on the object side of the second lens group $G_{32}$. Further, at the image plane IMG, the optical receiving surface of an imaging element such as a CCD and CMOS is disposed.

Various values related to the imaging lens according to the sixth example are indicated below.
Focal length for entire imaging lens (f)=12.0
Focal length of image-side surface of third lens group $G_{33}$ ($f_3$)=7.24
F number=2.0
Half angle of view ($\omega$)=17.5°
Object distance (distance from first lens surface of imaging lens to object)=11260
Back focal length of imaging lens (BF)=6.89
Distance from first lens surface in imaging lens to image plane (L)=20.05
Radius of curvature of first lens surface in imaging lens ($R_1$)=23.5
Interval between third lens group $G_{33}$ and fourth lens group $G_{34}$ ($D_{3-4}$)=0.1
(Values related to conditional expression (4))

$$BF/L=0.33$$

(Values related to conditional expression (5))
Absolute value of angle formed by marginal ray of central beam emitted from last lens surface of imaging lens and normal to lens at position where ray is emitted ($\theta$)=20.6
(Values related to conditional expression (6))

$$f/R_1=0.51$$

(Values related to conditional expression (7))

$$D_{3-4}/f=0.008$$

(Values related to conditional expression (8))
refractive index at d-line of third lens group $G_{33}$ $$(n_3)=1.88300$$

(Values related to conditional expression (9))

$$f/f_3=1.66$$

Figure 14:
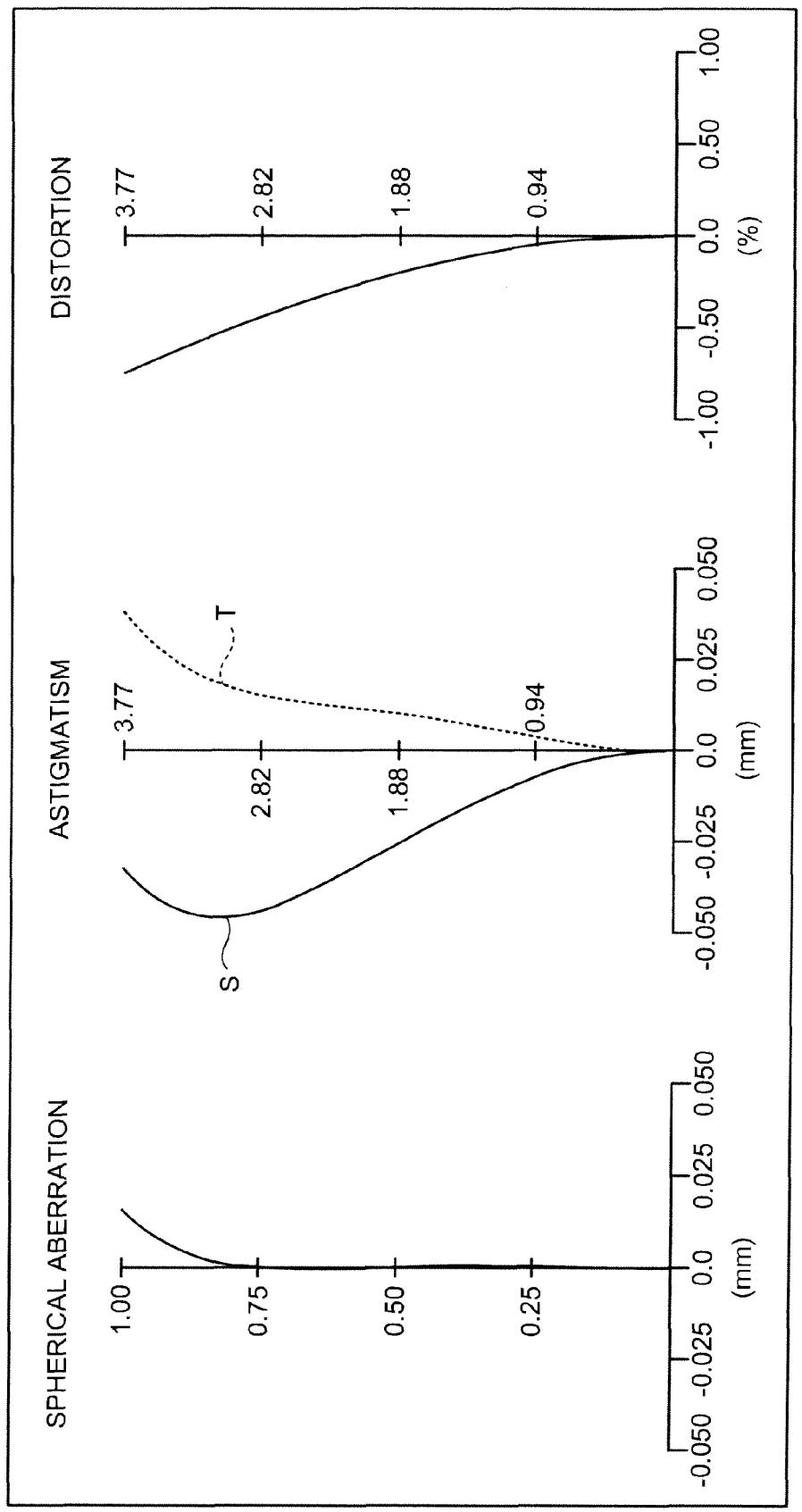
FIG. 14 is a diagram of various types of aberration occurring at d-line (λ=587.56 nm) of the imaging lens according to the sixth example.

$r_1=23.5$
  $d_1=1.7$ $nd_1=1.77250$ $vd_1=49.60$
$r_2=-45.62$
  $d_2=1.1$
$r_3=5.5$
  $d_3=1.7$ $nd_2=1.74320$ $vd_2=49.31$
$r_4=5.77$
  $d_4=1.4$
$r_5=-7.93$
  $d_5=0.6$ $nd_3=1.84666$ $vd_3=23.78$
$r_6=7.93$
  $d_6=0.4$
$r_7=19.5$
  $d_7=3.15$ $nd_4=1.88300$ $vd_4=40.78$
$r_8=-6.36$
  $d_8=0.1$
$r_9=-1000.0$ (aspheric surface)
  $d_9=3.0$ $nd_5=1.58313$ $vd_5=59.38$
$r_{10}=-22.917$ (aspheric surface)
  $d_{10}=6.89$
$r_{11}=\infty$ (image plane)
Constant of the cone ($\epsilon$) and aspheric coefficients (A, B, C, D, E)
(ninth plane)
$\epsilon=1.0000$, A=0,
B=$-1.15354\times10^{-3}$, C=$7.85181\times10^{-6}$,
D=$-2.76448\times10^{-6}$, E=$2.12883\times10^{-7}$
(tenth plane)
$\epsilon=1.0000$, A=0,
B=$-1.18654\times10^{-3}$, C=$2.18354\times10^{-6}$,
D=$-9.79716\times10^{-7}$, E=$5.61660\times10^{-8}$ FIG. 14 is a diagram of various types of aberration occurring at d-line ($\lambda=587.56$ nm) of the imaging lens according to the sixth example. Reference symbols S and T used with respect to astigmatism indicate aberration in the sagittal direction and in the tangential direction, respectively.

Among the values for the examples above, $r_1$, $r_2$, . . . indicate radii of curvature for each lens, aperture stop surface, etc.; $d_1$, $d_2$, . . . indicate the thickness of the lenses, diaphragm, etc. or the distance between surfaces thereof; $nd_1$, $nd_2$, . . . indicate the refraction index of each lens with respect to the d-line ($\lambda=587.6$ nm); $vd_1$, $vd_2$, . . . indicate the Abbe number with respect to the d-line ($\lambda=587.6$ nm) of each lens.

Each of the aspheric surfaces above can be expressed by the following equation, where with respect to the vertex as a point of reference, H is the height perpendicular to the optical axis and X(H) is the change in H along the direction of optical axis.

$$X(H) = \frac{H^2/R}{1+\sqrt{1-(\epsilon H^2/R^2)}} + AH^2 + BH^4 + CH^6 + DH^8 + EH^{10} \qquad \text{[Equation 2]}$$

R is paraxial radii of curvature; $\epsilon$ is constant of the cone; A, B, C, D, and E are the second, fourth, sixth, eighth, and tenth aspheric coefficients, respectively.

As described, by satisfying the conditional expressions above, the examples of the imaging lens herein are able to control ghosting occurring between the last lens surface and the imaging element and ghosting caused by light reflected by the lens surface nearest the object, without sacrifice to the compact-size of the optical system or high optical performance.

Further, since the examples of the imaging lens herein employ a lens having a suitable aspheric surface, effective correction of various types of aberration can be performed using fewer lens elements and reductions in the size, weight, and cost of the optical system can be facilitated.

As the examples of the imaging lens herein do not employ a cemented lens, even if rapid temperature changes occur, no deterioration of optical performance results.

INDUSTRIAL APPLICABILITY

As described, the imaging lens of the present invention is useful in digital video cameras having solid state imaging devices and is particularly applicable to vehicle-mounted cameras susceptible to high temperatures.

The invention claimed is:

1. An imaging lens consisting of, sequentially from an object side:
    a negative first lens;
    a positive second lens;
    a negative third lens; and
    a positive fourth lens having a convex surface on an image side, wherein
    $\theta \geq 30°$ is satisfied and $f/R_1 \geq 0.3$ is satisfied, $\theta$ being an angle formed by a marginal ray of a central beam emitted from a last lens surface of the imaging lens and the normal to the lens at the position where the marginal ray is emitted; f being the focal length of the imaging lens; and $R_1$ being the radius of curvature of a first lens surface in the imaging lens.

2. The imaging lens according to claim 1, wherein $n_1 \geq 1.51$ is satisfied, $n_1$ being the refractive index at d-line of the first lens.

3. The imaging lens according to claim 1, wherein an aspheric surface is formed on at least one surface of the second lens.

4. The imaging lens according to claim 1, wherein the second lens is configured by a biconvex lens.

5. The imaging lens according to claim 1, wherein $\theta \leq 36.5°$ is satisfied.

6. The imaging lens according to claim 1, wherein the first lens is configured by a meniscus lens disposed with the convex surface on the object side.

* * * * *